United States Patent
Weissman et al.

(10) Patent No.: US 8,510,729 B2
(45) Date of Patent: Aug. 13, 2013

(54) SYSTEM, METHOD AND COMPUTER PROGRAM PRODUCT FOR VERSIONING AND DEPRECATION OF COMPONENTS OF AN APPLICATION

(75) Inventors: Craig Weissman, San Francisco, CA (US); Andrew Smith, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 534 days.

(21) Appl. No.: 12/784,668

(22) Filed: May 21, 2010

(65) Prior Publication Data
US 2010/0299663 A1  Nov. 25, 2010

Related U.S. Application Data

(60) Provisional application No. 61/180,368, filed on May 21, 2009.

(51) Int. Cl.
*G06F 9/44* (2006.01)

(52) U.S. Cl.
USPC ............... 717/170; 717/120; 717/122

(58) Field of Classification Search
None
See application file for complete search history.

(56) References Cited

U.S. PATENT DOCUMENTS

| | | | |
|---|---|---|---|
| 7,062,650 B2 * | 6/2006 | Robbins et al. | 713/167 |
| 7,140,012 B2 * | 11/2006 | Pugh et al. | 717/170 |
| 7,178,143 B2 * | 2/2007 | Pugh et al. | 717/170 |
| 7,209,929 B2 | 4/2007 | Dominguez, Jr. et al. | 707/103 |
| 7,523,444 B2 * | 4/2009 | Quinn et al. | 717/170 |
| 7,698,160 B2 | 4/2010 | Beaven et al. | |
| 7,873,958 B2 * | 1/2011 | Wiltamuth et al. | 717/170 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,095,911 B2 * | 1/2012 | Ronen et al. | 717/122 |
| 8,275,836 B2 | 9/2012 | Beaven et al. | |
| 8,356,280 B2 * | 1/2013 | Becker et al. | 717/170 |
| 8,407,686 B2 * | 3/2013 | Huang et al. | 717/170 |
| 2002/0133805 A1 * | 9/2002 | Pugh et al. | 717/120 |
| 2002/0174193 A1 * | 11/2002 | Mikhalchuk | 709/219 |
| 2003/0187929 A1 * | 10/2003 | Pugh et al. | 717/170 |
| 2003/0233404 A1 | 12/2003 | Hopkins | 709/203 |
| 2005/0065925 A1 | 3/2005 | Weissman et al. | 707/4 |

(Continued)

FOREIGN PATENT DOCUMENTS

| | | | |
|---|---|---|---|
| EP | 1160665 A2 | 5/2001 | |
| EP | 1569093 A2 | 8/2005 | |
| WO | 02073403 A1 | 9/2002 | |

OTHER PUBLICATIONS

Jaroslav Gergic, "Towards a Versioning Model for Component-based Software Assembly", 2003 IEEE, ICSM'03, pp. 1-10; <http://ieeexplore.ieee.org/stamp/stamp.jsp?tp=&arnumber=1235415 >.*

Kaur et al., "Version management and composition of software components in different phases of software development life cycle", 2009 ACM, SIGSOFT Software Engineering Notes, Jul. 2009, vol. 34, No. 4, pp. 1-9; <http://dl.acm.org/citation.cfm?doid=1543405.1543416 >.*

(Continued)

*Primary Examiner* — Thuy Dao
*Assistant Examiner* — Ben C Wang
(74) *Attorney, Agent, or Firm* — Zilka-Kotab, PC

(57) ABSTRACT

In accordance with embodiments, there are provided mechanisms and methods for versioning components of an application. These mechanisms and methods for versioning components of an application can ensure that an updated application maintains backwards compatibility, such that the application developer may maintain a single application while supporting multiple prior versions of the application.

15 Claims, 5 Drawing Sheets

(56) References Cited

U.S. PATENT DOCUMENTS

| | | | |
|---|---|---|---|
| 2005/0223022 A1 | 10/2005 | Weissman et al. | 707/102 |
| 2005/0283478 A1 | 12/2005 | Choi et al. | 707/9 |
| 2006/0206834 A1 | 9/2006 | Fisher et al. | 715/777 |
| 2006/0294494 A1* | 12/2006 | Quinn et al. | 717/170 |
| 2007/0234290 A1* | 10/2007 | Ronen et al. | 717/120 |
| 2007/0234291 A1* | 10/2007 | Ronen et al. | 717/120 |
| 2008/0010243 A1 | 1/2008 | Weissman et al. | 707/2 |
| 2008/0201568 A1* | 8/2008 | Quinn et al. | 713/1 |
| 2008/0201701 A1* | 8/2008 | Hofhansl et al. | 717/168 |
| 2009/0013010 A1* | 1/2009 | Fang et al. | 707/203 |
| 2009/0049102 A1* | 2/2009 | Weissman | 707/104.1 |
| 2009/0049288 A1 | 2/2009 | Weissman | 712/245 |
| 2009/0055809 A1 | 2/2009 | Campbell | |
| 2009/0144703 A1* | 6/2009 | Vairavan et al. | 717/122 |
| 2009/0276770 A1* | 11/2009 | Taieb et al. | 715/177 |
| 2009/0292717 A1* | 11/2009 | Gallardo et al. | 707/101 |
| 2009/0327358 A1* | 12/2009 | Lukiyanov et al. | 707/203 |
| 2010/0064277 A1* | 3/2010 | Baird et al. | 717/120 |
| 2010/0185902 A1* | 7/2010 | Fang et al. | 714/48 |
| 2010/0318968 A1* | 12/2010 | Traut et al. | 717/122 |

OTHER PUBLICATIONS

Lau et al., "Software Component Models", 2007 IEEE, IEEE Transactions on Software Engineering, vol. 33, No. 10, Oct. 2007, pp. 709-724; <http://ieeexplore.ieee.org/stamp/stamp.jsp?tp=&arnumber=4302781>.*

Cadar et al., "Multi-version Software Updates", 2012 IEEE, HotSWUp 2012, Zurich, Switzerland, pp. 36-40; <http://ieeexplore.ieee.org/stamp/stamp.jsp?tp=&arnumber=6226615>.*

Hoek et al., "Software Release Management for Component-based Software", 2002 John Wiley & Sons, Ltd, Nov. 27, 2002, pp. 77-98; <http://www.doc.ic.ac.uk/~alw/doc/papers/spe0103.pdf>.*

International Search Report and Written Opinion from PCT Application No. PCT/US10/35843 mailed on Jul. 21, 2010.

U.S. Appl. No. 60/828,192 which was filed on Oct. 4, 2006.

Extended European Search Report from European Patent Application No. 10778500.8, dated Mar. 27, 2013.

* cited by examiner

SYSTEM, METHOD AND COMPUTER PROGRAM PRODUCT FOR VERSIONING AND DEPRECATION OF COMPONENTS OF AN APPLICATION

CLAIM OF PRIORITY

This application claims the benefit of U.S. Provisional Patent Application 61/180,368 entitled "Method And System For Component Versioning," by Craig Weissman, filed May 21, 2009, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to updating an application, and more particularly to supporting multiple versions of an application.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, applications are periodically updated by the respective application developer for various purposes. For example, an application is generally updated for providing fixes to errors (e.g. bugs) within the application, providing new functionality within the application, etc. The result of applying an update to an application is the existence of a new version of the application.

Unfortunately, the existence of different application versions generally requires the application developer to maintain and continue support for all of the available versions or to force users of the application to install the latest version. In many cases the application developers desires to force the users of the application to install the latest version in order to avoid having to maintain and support each individual version of the application. However, this oftentimes limits the application developer with respect to the changes that can be included in a particular update (e.g. such that the user's use or integration of the application is not destroyed).

BRIEF SUMMARY

In accordance with embodiments, there are provided mechanisms and methods for versioning components of an application. These mechanisms and methods for versioning components of an application can ensure that an updated application maintains backwards compatibility, such that the application developer may maintain a single application while supporting multiple prior versions of the application.

In an embodiment and by way of example, a method is provided for versioning components of an application. In use, a request to access at least a portion of an application is received from calling code. Additionally, a version for the application is provided by the calling code. Furthermore, in response to the request, the calling code is provided access to components of the application corresponding to the version provided.

While the present invention is described with reference town embodiment in which techniques for versioning components of an application are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for versioning components of an application.

To date, application developers have been limited to versioning applications, whereby each update to an application introduces a new version of the application. As a result, application developers have been limited to maintaining and supporting each version of the application Thus, mechanisms and methods are provided for versioning components of an application. These mechanisms and methods are provided for versioning components of an application can ensure that an updated application maintains backwards compatibility, such that the application developer may maintain a single application while supporting multiple prior versions of the application in the latest version.

Next, mechanisms and methods for versioning components of an application will be described with reference to exemplary embodiments.

Figure 1:
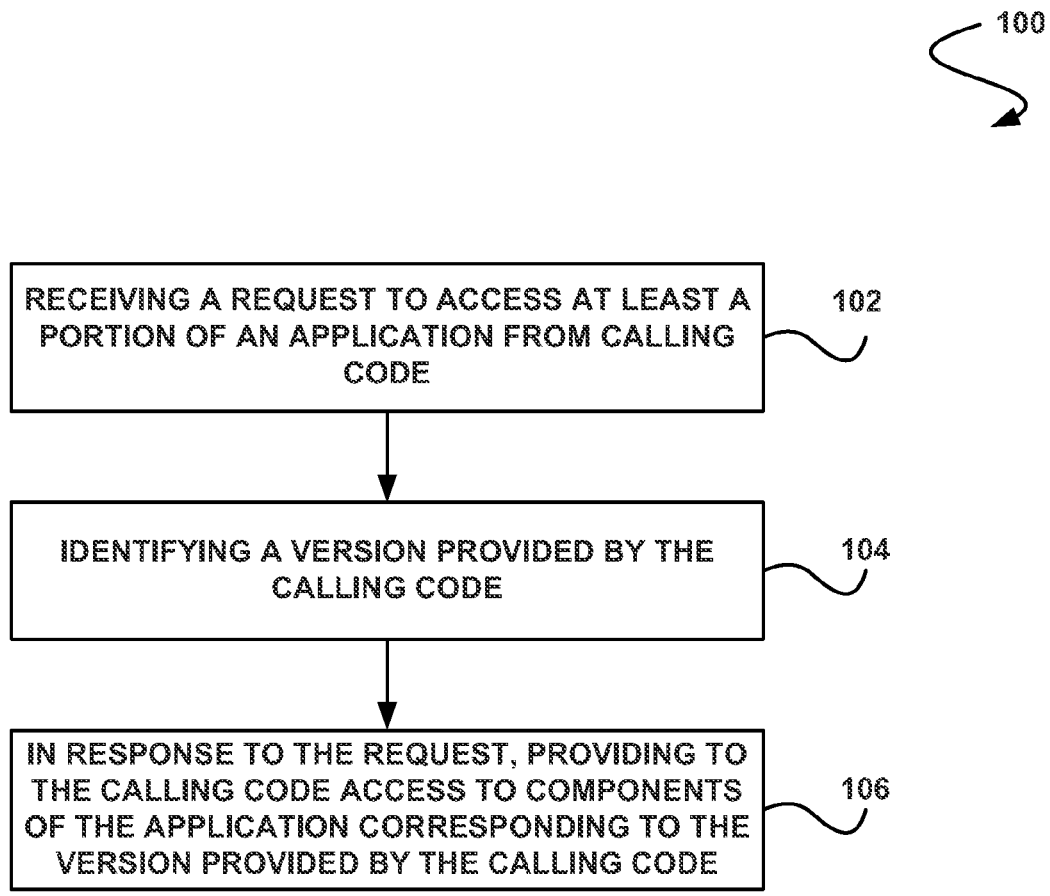
FIG. 1 shows a method for versioning components of an application, in accordance with one embodiment.

FIG. 1 shows a method 100 for versioning components of an application, in accordance with one embodiment. As shown in operation 302, a request to access at least a portion of an application is received from calling code. With respect to the present description, the application (e.g. package, etc.) may include any package, computer code, etc. of which at least a portion may be requested to be accessed by calling code. To this end, the portion or more of the application that is requested to be accessed may include a particular method, interface (e.g. application program interface, user interface, etc.), table, field, data, etc. of the application.

In one embodiment, the application may include computer code that is developed, maintained, published, etc. utilizing a multi-tenant on-demand database service. It should be noted that such multi-tenant on-demand database service may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

In another embodiment, the application may be developed by a tenant of the aforementioned multi-tenant on-demand database service. For example, the application may be developed by the tenant for use by other tenants of the multi-tenant on-demand database service. Thus, the multi-tenant on-demand database service may store the application upon receipt by the tenant that developed the application for allowing the application to be accessed by the other tenants.

Additionally, the calling code from which the request is received may include an application program interface (e.g. of the multi-tenant on-demand database service), a user interface, such as a graphical user interface (e.g. of the multi-tenant on-demand database service), or any other code capable of requesting access to the portion of the application. For example, the calling code may include a portion of another application developed by one of the other tenants of the multi-tenant on-demand database service described above. Thus, the calling code may be utilized for integrating the application with another application developed by another tenant of the multi-tenant on-demand database service.

Optionally, the request received from the calling code may include a call to the portion of the application. As other options, the request may be to read the portion of the application, write to the portion of the application, etc. Of course, however, the request may be for any type of access to the portion of the application.

Further, a version provided by the calling code is identified, as shown in operation 104. The version provided by the calling code may include any indicator (e.g. identifier, etc.) of a version of the application. For example, the version may indicate a particular state of an application among a plurality of existing states of the application, where each state differs based on an update (e.g. patch, etc.) applied to the application.

In one embodiment, the version provided by the calling code may be determined from a header of the request. For example, the header of the request may specify the version provided by the calling code. In another embodiment, the version provided by the calling code may be determined from a uniform resource locator (URL) associated with the request (e.g. from which the request originated).

In yet another embodiment, the version provided by the calling code may be determined from a default version specified by a setting associated with a developer of the calling code. For example, a version may not necessarily be configured specifically for the calling code, but instead a default version may be specified with respect to the developer of the calling code. Accordingly, the default version may be applied to all applications (including calling code) with a version unspecified by the developer of such applications. It should be noted that such default version may optionally include an installed version of the application including the calling code.

In still yet another embodiment, the version may be an unspecified version. For example, if the default version described above it not employed, enabled, etc., and the version provided by the calling code has not been specified, the version may be identified as being an unspecified version (e.g. may be identified as "unspecified"). The unspecified version may be automatically determined according to a latest version installed by the tenant associated with the calling code. Of course, while various embodiments have been described above regarding the manner in which the version provided by the calling code may be identified, it should be noted that the version provided by the calling code may be identified in any desired manner.

Still yet, as shown in operation 106, the calling code is provided access to components of the application corresponding to the version provided by the calling code, in response to the request. With respect to the present description, such components may include any subparts of the portion of the application requested to be accessed that correspond to the version provided by the calling code. For example, the components may include an object, field, class, method, identifier, table, etc. Thus, providing access to the components of the application corresponding to the version provided by the calling code may include fulfilling the request to access the portion of the application by providing access to the components associated with the portion of the application that correspond to the version of the application (e.g. by allowing a read of the components of the application, a write to the components of the application, calling the components of the application, etc.).

In one embodiment, the components of the application corresponding to the version provided by the calling code may be determined in order to provide the calling code with access thereto. It should be noted that the components may correspond with the version provided by the calling code by being specific to the version provided by the calling code, by being allowed to be accessed by the version provided by the calling code according to predetermined rules, etc., such as in the manner described below.

Optionally, such components may be determined from a plurality of components of the application, and thus may encompass only a subset of all components associated with the requested portion of the application. For example, multiple versions of the portion of the application requested to be accessed may exist within (e.g. be supported by) the application by providing an indication of a version for each of the components of the application. Thus, as an option, multiple components may provide similar functionality but may be associated with different versions (e.g. a first component providing a first function may include an original component of the application and thus associated with a first version of the application, a second component providing the first function may include an updated version of the first component and thus associated with an updated version of the application, etc.). To this end, the calling code may be provided access to the components with versions corresponding to the version provided by the calling code, in response to the calling code's above described request.

For example, the application may be a latest version of an application, which includes a superset of all components that have ever been released with respect to the application, along with the versioning annotation associated with each component. In this way, the latest version of the application may utilize such annotations to emulate previous (e.g. older) versions in shape and behavior. In one embodiment, the application may determine (e.g. at runtime) the components of the application corresponding to the version provided by the calling code, and may provide the calling code with access to those determined components. In this way, the application may be capable of switching procedural logic within the application based on which components are determined to correspond with the version provided by the calling code.

In one embodiment, the components of the application corresponding to the version provided by the calling code may be determined based on predetermined rules. As an option, the predetermined rules may be specific to a type of the calling code. Such type of the calling code may include an application program interface, a user interface, etc., such that a first set of predetermined rules applicable to an application program interface that requested access to the portion of the application may be different from a second set of predetermined rules applicable to a user interface that requested access to the portion of the application.

In another embodiment, the predetermined rules may be specific to a type of the portion of the application (requested to be accessed by the calling code). The type of the portion of the application may include, for example, standard components managed by the multi-tenant on-demand database service, custom components created by a developer of the application, or components installed as part of the application. Optionally, the predetermined rules may be specific to both the type of the calling code and the type of the portion of the application.

Just by way of example, for each of the components of the application, the component may be annotated with a version of the component, as described above. The annotation may optionally include a minimum version of the application and a maximum version of the application indicating a range of versions of the application to which the component corresponds. Of course, however, the annotation may include any indicator of a version of the component, for use in determining whether the component corresponds with the version provided by the calling code.

In one embodiment, the predetermined rules may indicate that the components of the application corresponding to the version provided by the calling code only include components of the application each annotated with a version matching the version provided by the calling code. Thus, for example, the rules predetermined to be applicable to calling code of a predetermined type that is requesting to access a portion of an application of a predetermined type may indicate that the components of the application corresponding to the version provided by the calling code (to which the calling code is allowed access) only include components of the application each annotated with a version exactly matching the version provided by the calling code.

In another embodiment, the predetermined rules may indicate that the components of the application corresponding to the version provided by the calling code only include components of the application each annotated with a version matching or later than the version provided by the calling code. For example, the rules predetermined to be applicable to calling code of a predetermined type that is requesting to access a portion of an application of a predetermined type may indicate that the components of the application corresponding to the version provided by the calling code (to which the calling code is allowed access) only include components of the application each annotated with a version exactly matching or later than the version provided by the calling code.

It should be noted that numerous examples of determining the components of the application corresponding to the version provided by the calling code, for providing the calling code with access thereto will be described in more detail below with respect to FIG. 3. By providing an indication of versions of calling to which each individual component of an application corresponds (e.g. by versioning the components as described above), backwards compatibility for the application may be maintained. Providing backwards compatibility in the aforementioned manner may allow the developer of the application to maintain a single application while supporting multiple prior versions of the application.

Figure 2:
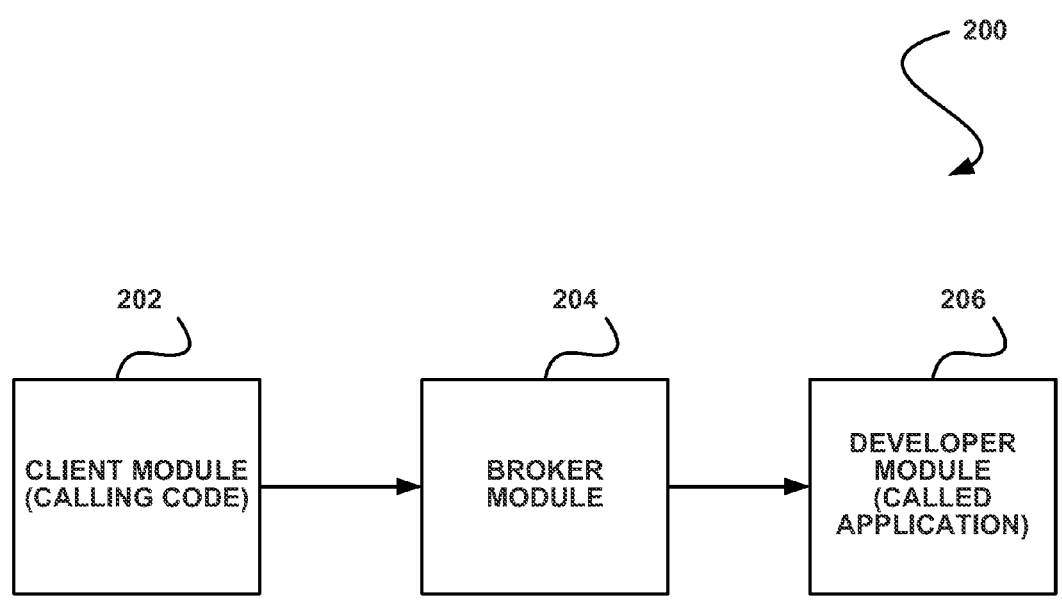
FIG. 2 shows a system for versioning components of an application, in accordance with another embodiment.

FIG. 2 shows a system 200 for versioning components of an application, in accordance with another embodiment. As an option, the present system 200 may be implemented in the context of the functionality of FIG. 1. Of course, however, the system 200 may be implemented in any desired environment. The aforementioned definitions may apply during the present description.

As shown, a client module 202 is in communication with a developer module 206 via a broker module 204. With respect to the present embodiment, the client module, 202, developer module 206, and broker module 204 may each include applications (e.g. interfaces) of a multi-tenant on-demand database service. For example, the client module 202 may be managed, maintained for use by, etc. a first tenant (e.g. the client tenant) of the multi-tenant on-demand database service, the developer module 206 may be managed, maintained for use by, etc. a second tenant (e.g. the developer tenant) of the multi-tenant on-demand database service, and the broker module 204 may be provided by the multi-tenant on-demand database service for use by each of the first tenant and the second tenant.

Thus, the broker module 204 may be employed by the multi-tenant on-demand database service for brokering a request by the client module 202 to access a portion of an application of the developer module 206. It should be noted that such brokering may include any mediating, processing, etc. As specifically shown in the present embodiment, the client module 202 may include calling code that calls an application (the called application) of the developer module 206.

In one embodiment, the client module 202 requests access to a portion of an application of the developer module 206. The request may be to read the portion of the application, write to the portion of the application, call the portion of the application, etc. In response to the client module 202 issuing the request, the broker module 204 receives (e.g. intercepts) the request, such that the request is at least temporarily prevented from being sent to the developer module 206.

In response to the request, the broker module 204 identifies a version provided by the calling code 202. For example, the broker module 204 may identify the version provided by the calling code 202 from a header of the request, from a default version set for the client module 202, etc. In one embodiment, the broker module 204 may invoke code to determine such version provided by the calling code 202.

The broker module 204 then provides an indicator of the version provided by the calling code 202 to the developer module 206. In this way, the developer module 206 may utilize the version provided by the calling code 202 to determine components of the called application 206 that correspond to the version provided by the calling code 202. Based on the determination of the components of the called application 206 that correspond to the version provided by the calling code 202, the developer module 206 provides the calling code 202 with access to the determined components. For example, the developer module 206 fulfills the request issued by the client module 202 using the determined components.

Figure 3:
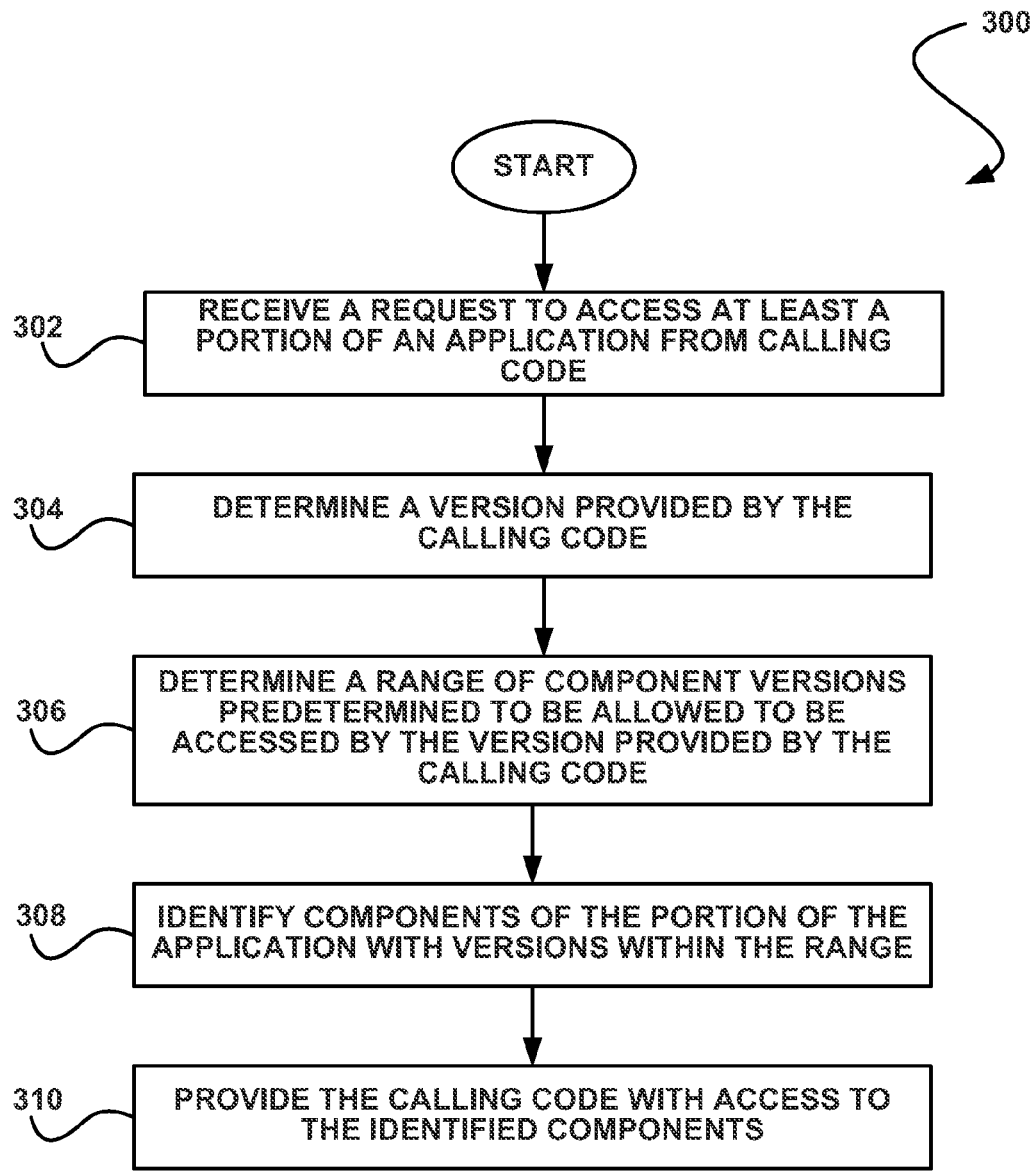
FIG. 3 shows a method for providing calling code with access to components of an application having versions within an accessible range for the calling code, in accordance with yet another embodiment.

FIG. 3 shows a method 300 for providing calling code with access to components of an application having versions within an accessible range for the calling code, in accordance with yet another embodiment. As an option, the method 300 may be carried out in the context of the functionality of FIGS. 1-2. Of course, however, the method 300 may be carried out in any desired environment. Again, the aforementioned definitions may apply during the present description.

As shown in operation 302, a request to access at least a portion of an application is received from calling code. Further, a version provided by the calling code is determined, as shown in operation 304. For example, the version provided by the calling code may be determined in response to the request.

Optionally, the version provided by the calling code may be determined in a predetermined manner that is dependent on a type of the calling code. For example, where the calling code is in the form of a web service definition language (WSDL) used by a tenant of the multi-tenant on-demand database service to build an application for use by multiple other tenants of the multi-tenant on-demand database service, the version provided by the calling code may be identified in the order shown in Table 1. For example, if the version cannot be identified using the first shown option, the version may be attempted to be identified using the second shown option, and so forth. Of course, it should be noted that the order shown in Table 1 is set forth for illustrative purposes only, and thus should not be construed as limiting in any manner.

TABLE 1

1. Identify version specified in the header of the request
2. Identify version specified in the default version setting for the calling code
3. Identify the version as unspecified (i.e. the latest version installed by the tenant associated with the calling code.

As another example, where the calling code is in the form of a WSDL used by a tenant of the multi-tenant on-demand database service to build an application for use by only the tenant, the version provided by the calling code may be identified in the order shown in Table 2. For example, if the version cannot be identified using the first shown option, the version may be attempted to be identified using the second shown option, and so forth. Of course, it should be noted that the order shown in Table 2 is set forth for illustrative purposes only, and thus should not be construed as limiting in any manner.

TABLE 2

1. Identify version specified in the header of the request
2. Identify version specified in the endpoint URL
2. Identify version specified in the default version setting for the calling code
3. Identify the version as unspecified With respect to the endpoint URL shown in Table 2, the user that generated the calling code WSDL may be required to specify a version to be used for each installed application. The default selection may optionally always be the latest. An ID may be embedded in the endpoint URL that may allow a determination of which versions to use for calls from that calling code WSDL (e.g. https://www-blitz03.soma.salesforce.com/services/Soap/c/16.0/[id]).

As noted above, the version provided by the calling code may be identified via a default version setting for the calling code. The default version may include the version provided by the calling code at the time the calling code is originally installed (e.g. and thus may not reflect any updates to the calling code). As an option, the default version may only be automatically set for calling code developed by a tenant for use only by that tenant. Calling code developed by a tenant for use by other tenants may be automatically set to being unspecified.

As another option, the manner in which the version of calling code written using Apex code (provided by Salesforce.com™) is determined may be different from that described above. For example, for execute anonymous, the version may be assumed to be unspecified. As another example, the Apex calling code may reference another tenant's application (i.e. one or more installed applications), such that the reference application may be used as a basis for determining the version provided by the calling code. Table 3 show examples of the various types of references that may be included in the calling code. Of course, it should be noted that such references are set forth for illustrative purposes only, and thus should not be construed as limiting in any manner.

TABLE 3

1. Explicit Reference: Code explicitly references schema or code from another installed application. These references may be detected at compile time. Apex tests will depend on the schema or code and must always pass.
2. Dynamic Apex Acting as Explicit: Code using dynamic Apex in place of explicit referencing. The scope of the referenced schema/code is finite and known to the developer at compile time. There is no way to detect these dependencies at compile time. Tests may be written using dynamic and are always expected to pass.
3. Dynamic Apex: This is the true dynamic use case where at compile time the developer doesn't know the finite set of schema that may be referenced.

Table 4 shows exemplary use cases of the types of references shown in Table 3. Again, it should be noted that such use cases are set forth for illustrative purposes only, and thus should not be construed as limiting in any manner.

TABLE 4

1. Partner (i.e. tenant) Extends Another Partner's Package (i.e. application)
   Partner B is extending the functionality of partner A's package. Partner B has installed partner A's package in their development org. Partner B depends on schema and global classes/methods from the base package (explicit and dynamic apex acting as explicit references). In certain cases, partner B is catching validation errors thrown by an Apex trigger from partner A's package. Partner B's tests are written to expect these errors. When partner A makes changes to their package and pushes a new version, partner B expects their application to keep working and tests continue to pass.
2. Independent Software Vendor (ISV) Builds Find/Replace Application
   ISV creates a utility that can perform find/replace on any object (ideally they would have a hook to scope to business objects only). This utility is written using Visualforce ™ and dynamic Apex. The customers using this tool expect that it has access to all standard and custom objects in their org regardless of when they were installed/created, this would even include deprecated schema. Ideally, any behavior behind these objects would emulate what is experienced in the user interface (UI) (latest version of the package). Typically the customer and ISV do not want to take any action in order for the tool to consume newly added schema by other packages, including Salesforce.com ™ (SFDC). The ISV does understand though that to consume new data types, etc, they might have to update their code to a later version of the SFDC application program interface (API).
3. Customer Integrates with Multiple Packages
   Customer creates an Apex trigger that performs data manipulation (DML) on various other objects from multiple installed packages. Even though the customer knows what objects they are referencing, the customer still wants to code with dynamic Apex since that's what they are most comfortable with. Customer expects their code to continue to work even if the various publishers of the packages deprecate schema and change behavior.

In one embodiment, upon first explicit reference, the version of the installed application the class/trigger references may be recorded. The recorded version may be the last installed version. The developer may be prevented from removing the binding to that version until all explicit references for that application are deleted. The developer can freely change the recorded version to any other version installed. The code may optionally be required to be recompiled when this occurs. There is a chance the apex/schema attempted to be referenced has been deprecated (made inactive, as will be described in more detail below) but was available to the application previously (installed as active). An error message may be thrown in this case telling the developer that this identifier is not available in the current version, but include the version(s) for which it is available.

As an option, the developer may also manually bind the version provided by the calling code to versions of additional installed applications, even though no explicit reference is detected. The use of dynamic apex may not cause a version binding to be record since these references may not be detected at compile time.

In another embodiment, where a developer creates a managed extension application (e.g. an application where limited changes are allowed), the application may depends on a specific version of a base. In this case, even dynamic apex may be required to bind to a version of the base. To address this issue, when creating apex/vf in the extension org, version binding information may be recorded on save for all installed applications. This may include applications the code is not referencing. At the time of extension upload, the version binding information may be omitted for applications that are not a base for the extension. This may ensure an extension application has a specified version binding for the base at all times. Binding information for existing code may optionally not be extended when a new application is installed in the extension. The code may be required to be edited and saved for a version binding to be recorded.

It should be noted that Visualforce™ code may be treated the same as Apex code, as described above. For example, upon first explicit reference, the Visualforce™ calling code may be bound to the currently installed application version. In another embodiment, when cloning a Visualforce™ or Apex component, all related versioning information may be copied in the clone.

Upon determination of the version provided by the calling code, a range of component versions predetermined to be allowed to be accessed by the version provided by the calling code is identified. Note operation 306. It should be noted that the component versions may refer to versions specific for a particular component. For example, the component may be annotated with the range of versions to which it is accessible.

In one embodiment, the component may be annotated with a minimum application version to which the component is accessible and a maximum application version to which the component is accessible. The minimum application version may be recorded when the component is released (e.g. published for use, activated, etc.) in the application. The maximum application version may be recorded once the component is uploaded as deprecated (e.g. an indicator to allow the developer to remove the existing released component). More information on such deprecation will be provided below.

In the present embodiment, the range of component versions predetermined to be allowed to be accessed by the version provided by the calling code may be identified based on predetermined rules. The set of predetermined rules utilized to identify the range of component versions allowed to be accessed by the version provided by the calling code may be identified based on several factors. In one embodiment, the set of predetermined rules may be specific to a type of the calling code (e.g. whether the calling code is an API or a UI). In another embodiment, the set of predetermined rules may be specific to a type of the portion of the application requested to be accessed (e.g. whether the portion of the application requested to be accessed includes standard components managed by a multi-tenant on-demand database service, custom components created by a developer of the application, or components installed as part of the application).

Table 5 shows examples of which set of predetermined rules may be utilized to identify the range of component versions allowed to be accessed by the version provided by the calling code (e.g. based on the type of the calling code and the type of the portion of the application requested to be accessed). In Table 5, strict binding refers to only allowing the version provided by the calling code to access components with a matching version, and loose binding refers to only allowing the version provided by the calling code to access components with a matching or later version. It should be noted that the examples shown in Table 5 are set forth for illustrative purposes only, and thus should not be construed as limiting in any manner.

TABLE 5

|  | SFDC Standard Schema | Local Custom Schema | Schema from Managed Packages |
|---|---|---|---|
| SFDC API | Strict | Loose | Loose |
| SFDC UI (typically no concept of version applies) | Loose | Loose | Loose |

As shown, only standard Salesforce.com™ schema may take a strict binding approach. With strict binding, a developer may have to change an API endpoint access to any new objects exposed in a later API version is desired. This may allow a developer to hide an existing entity when a replacement is introduced, so that only one entity at a time may be seen when running a describe call. With respect to the UI, however, if a new business object is introduced, then reports, workflow, list views, etc. may be automatically built against it.

As also shown, schema created by customers or installed as part of a package may only be loosely bound, such that a developer may almost never have to change an API version to access new entities. This may allow generic utilities to interact with any piece of schema using the API describe call (i.e. Dataloader).

In another embodiment, the factors upon which the set of predetermined rules utilized to identify the range of component versions allowed to be accessed by the version provided by the calling code is identified may include whether the calling code is of a specified version (e.g. identifiable via a header of the request, via a default version set for the calling code, etc.) or is of an unspecified version.

Optionally, with respect to the API, only objects and methods exposed in that API version may be available. For example, any new components added in a later version may not be available in an earlier version. Note component availability may not apply to local custom objects and fields since these may not have a specific tie to an API version, as shown in Table 5 above. In particular, they may be available in all API versions that support the underlying data types for those objects and fields.

If the calling code version is specified, the predetermined rules may indicate that all components available as of the version or added in a later version will be available. This may include components deprecated in a future version. Optionally, only apex identifiers available at that version may be exposed, and Apex behavior may be as of that version.

If the calling code version is unspecified, when the application including the calling code is installed, the latest version installed may be recorded. All components available as of the version or added in a later version may be available. The component availability may impact static references and describe calls. The only exception may be schema that cannot be supported by the pairing API version used in the call (e.g. where a new data type is introduced). In general, the application API may be loosely bound compared to the Salesforce.com™ API.

In yet another embodiment, the factors upon which the set of predetermined rules utilized to identify the range of component versions allowed to be accessed by the version provided by the calling code is identified may include whether the calling code is included in an application available for use by multiple tenants of the on-demand database service (referred to as a partner API) or is available for use only by the tenant that developed the application (referred to as an enterprise API). The predetermined rules applied to a partner API may include the loosely bound ruleset described above. The predetermined rules applied to an enterprise API may include the strictly bound ruleset described above.

A describe call issued by calling code included in an enterprise application may return all components available at that specific application version. For example, the describe call for a component (e.g. object, field, etc.) may return the namespace prefix and an indication of the whether the component is deprecated. Components deprecated in an earlier version may not be exposed even if it is present in the application. Schema introduced in a later application version may not be available. Behavior may exhibit the specific version specified.

Thus, the predetermined rules described above may be utilized to determine whether the calling code is to be strictly bound to components with the same version as the calling code or is to be loosely bound to components with the same or later version as the calling code. Based on such determination, the range of component versions predetermined to be allowed to be accessed by the version provided by the calling may be identified. For example, in the former case the range of component versions may be limited to those matching the version provided by the calling code. In the latter case, the range of component versions may be limited to those matching or later than the version provided by the calling code.

Once the range of component versions predetermined to be allowed to be accessed by the version provided by the calling code is identified, components of the portion of the application requested to be accessed by the calling code with versions within the range are identified. Note operation 308. In one embodiment, a mathematical formula may be utilized to compare the versions of components of the portion of the application with the range of component versions predetermined to be allowed to be accessed by the version provided by the calling code. In this way, only components of the portion of the application falling within the range may be identified.

Moreover, the calling code is provided with access to the identified components, as shown in operation 310. For example, the request issued by the calling code may be fulfilled utilizing the identified components. To this end, versioning of components of the application may be utilized for providing functionality of the application that is associated with a version provided by the calling code.

As noted above, components of the application may be annotated for determining the versions provided by the application to which they correspond, and thus the versions of calling code that to which they are accessible. As also briefly noted above, such annotation may include a maximum application version that is configured upon deprecation of the component. For example, tenants of the multi-tenant on-demand database service may desire to have their developed application evolve, including the ability to remove existing released components. Just by way of example, the tenant may be moving to Visualforce™ and may want to remove all the controls from their application, the tenant may discover they selected an incorrect field type and want to migrate to a new field of a different type, etc. Deprecating a component may allow the tenant to evolve their application without introducing an immediate change for tenants already utilizing the application.

Deprecation may be provided for various categories of components. Table 6 illustrates some examples of the categories of components for which deprecation may be provided. It should be noted that the examples shown in Table 6 are set forth for illustrative purposes only, and thus should not be construed as limiting in any manner.

TABLE 6

Non-Upgradeable Components
Both developer and subscriber (i.e. user) can freely make changes or delete.
Developer must delete the component to remove it from a package after it is released.
The developer can undelete the component from the package detail page up until it is
released in the deleted state.
Upgradeable Components
Both the developer and subscriber cannot delete these components after they are
released. A developer can continue to update the component. Values for developer
controlled attributes of a component will be updated in the subscriber's organization.
Other attributes will not.
Protected Components
This is a small subset of upgradeable components such as custom labels and
workflow actions. They behave similar to an upgradeable component. A subscriber
can see these components in their organization, but not reference them. This allows
the developer to delete these components at any time. The developer can undelete the
component from the package detail page up until the component is released in the
deleted state. Once uploaded in a managed-released package and that package
version is installed into an existing subscriber's organization, the deleted components will
be removed from a subscriber's organization.
Public/Private Apex Class/Trigger
Any apex class with an access modifier of public or private can be deleted, similar to a
protected component. This component is not "deleted" from the developer's
organization. It still appears in the UI. Only the status is marked as deleted. When a
subscriber receives an upgrade with the deleted code, it is removed from their org.

Furthermore, the components may have a particular lifecycle, as shown in Table 7 by way of example only.

TABLE 7

Component created
Component added to package
Component uploaded as beta; no manageability restrictions enforced in
dev org; component dev name cannot be changed; developer can
remove components from package
Component uploaded as released; manageability restrictions enforced;
developer cannot remove components from package - must delete TABLE 7-continued the component to remove from package, if possible
Component deprecated/deleted from package With deprecation of components (i.e. schema), the tenant's intent with the deprecation may be ascertained. The intent may alter how the tenant wants the deprecated component to behave for existing users of an application including the component. Table 8 illustrates three exemplary use cases. Again, the examples shown in Table 8 are set forth for illustrative purposes only, and thus should not be construed as limiting in any manner.

TABLE 8

Core Schema: Partner (i.e. developer) wants to deprecate a field actively used in their
application (i.e. Opportunity Stage). Maybe they are replacing it with a new field of a
different data type or splitting it into multiple fields. At the time of upgrade, they
would run an upgrade script to migrate the data to the schema. They would add
triggers to handle input into the deprecated field for backwards compatibility.
After the field is deprecated, the partner wants to encourage their existing customers
(e.g. users) to stop using the field. They want to prevent subscribers from creating
new references to the field (workflow, approval processes, etc). Soft references like
reports, email templates, etc. are fine so long as they degrade gracefully upon
removal. New customers would never receive the deprecated field.
In a perfect world, the field would be immediately deleted for all subscribers. Since
this isn't possible, the partner wants to offer a grace period where they will maintain
backwards compatibility for existing subscribers. After that time, they want to force
remove the field from all customer orgs. At that time, they would remove all
references in their application and fully delete the field from their footprint.
Non-Core Schema: Partner added an object to their application with the idea they
might enhance the object in the future (think about us with Assets - big plans, but
little delivery). As the partner finds their place in the market, they discover these
objects no longer make sense for their product. They want to remove this schema on
a go forward basis, but for existing customers they should continue to be able to use
the object like any other.
In this case, deprecation has an entirely different meaning. Existing customers should be
able to use them like any other schema. The partner doesn't intend to delete the
schema from existing customer orgs. The partner's goal is to prevent new customers
from receiving the schema. The partner also wants to remove the schema from their
development footprint.
Template Schema: Partner wants to offer a few template objects/fields with their
application. They have no plans of upgrading them - they are simply a template.
They would be 100% subscriber controlled. At some point in the future, partner
decides they no longer want this schema to be part of their application. New
customers would then not receive this schema. Existing customers would continue to
be able to use this schema until they are ready to delete it. The partner would delete
the schema in their development environment.

To this end, the user's and developer's experience with a deprecated component may be different depending on the developer's intent. For each of the above scenarios shown in Table 8, the lifecycle and behavior for each party is shown in Table 9, by way of example only.

"Where is this used" button to determine all references. The notification and where used may be identical lists. In the case of non-upgradeable components, the references may be hidden. As another option, a component may be un-deprecated

TABLE 9

Core Schema:
    1. Developer deprecates an object/field:
        The developer can use the "where is this used" feature to identify the remaining
        references. This includes all non-upgradeable components.
        References in all non-upgradeable components are removed automatically (except
        the ones typically are left around during a delete operation). This is primarily
        reports, list views, page layouts, etc.. This may also cause some components to
        be deleted.
    2. Subscriber upgrades to a version of the application with the deprecated schema:
        No change other than the rules mentioned around versioning and schema
        exposure.
    3. Developer releases notification in next upgrade that version with deprecated schema will
       be end of life (deleted) in 9 months:
        There is a chance someone could pull upgrade to a version where the component
        is completely deprecated. They may be notified on install of upgrade?.
        it may be a requirement that you are using push upgrades to release this
        notification.
        Subscriber is warned about pending deletion. The subscriber can force end of life
        (EOL) of that version in their org (roll org package minimum forward a version).
        Developer can use partner to understand which orgs still contain references to old
        version
    4. All org minimums for all customers are now greater than deprecated version:
        Developer now can "delete" those deprecated components in their dev org. The
        traditional delete blocking logic is used.
    5. What if an extension depends on an EOL version?
        The extension will continue to function up until end of life date.
        Block install/upgrade if extension depends on EOL version. May break if
        developer removes apex code after that.
        Optionally warn extension providers on upload when releasing a version that uses
        deprecated components.
        There is a chance an installed extension may not function due to EOL.
Non-Core Schema:
    1. Developer wants to allow existing subscribers to take control of schema:
        Developer uses instance level manageability to change schema from dev
        controlled to sub controlled.
        No dev controlled components can reference the now sub controlled schema.
        Should cascade change related components that are referencing now sub
        controlled schema to also being sub controlled.
    2. Subscriber upgrades to a version of the application with the now sub-controlled schema:
        Subscriber can change anything except dev name and NS.
            If component is referenced by installed extension, of course impacting
            changes are blocked.
    3. Developer wants to remove schema now from their dev org, prevent new installs from
       receiving:
        Developer deletes schema and related components from dev org
        Uploads package with deleted schema
        No new installs receive schema
    4. What if extension depends on the now sub-controlled schema?
        Existing customers are fine
        New installs of extension may be blocked
        Extension upgrades may need to be blocked. Could newly reference now sub-
        controlled schema in base.
Template Schema:
    1. Developer introduces new schema that is always under subscriber controlled:
        No dev controlled components can reference the sub controlled schema.
    2. Subscriber installs/upgrades to a version of the application with the sub-controlled
       schema:
        Dev name is still locked. Component is still namespaced.
    3. Developer wants to remove schema now from their dev org, prevent new installs from
       receiving:
        Developer deletes schema and related components from dev org
        Uploads package with deleted schema
        No new installs receive schema
    4. Extensions may not reference this type of schema Optionally, when deprecating a component, the developer may continue to be allowed to use the component. The developer may be notified at time of deprecation of the other components that are referencing it. The developer may use the prior to upload in an application, which may result in un-deprecation of all related components.

When deprecating an object, there may be certain related components that may be required to also be deprecated in the same release. For those components, there may be no way to remove the reference to the deprecated component. The only option may be to also deprecate the component. The following components shown in Table 10 as referencing the object must be deprecated in the same upload, for example.

TABLE 10

Custom tab for object
Reports with object as core reference
Custom report types with object as top level object
Fields on object
Validation rules on object
Page layouts on object
List views on object
Custom buttons/links on object
Apex sharing reasons/recalc on object
Triggers on object
Record types on object
VF pages using standard controller or tab style of object
Workflow rules for object
Workflow field updates for object
Workflow outbound messaging for object
Workflow alerts for object
Workflow tasks for object
Analytic snapshot where object is target As an option, the following subscriber-controlled components can continue to exist, but may be required to be updated to reflect the deletion: (1) Reports with object as non-core object (detail object in a master detail report); and (2) Custom report types with object not used as core object.

When deprecating fields, the following shown in Table 11 may be required to be deprecated in the same upload, for example.

TABLE 11

Custom report types (removing lookup field would cause report type to be deprecated)
Workflow field updates (cross object may be updated to point to a different object)

When deprecating a field, there may be certain related components that must also be deprecated in the same release. For those components, there may be no way to remove the reference to the deprecated schema. The only option may be to also deprecate the component. Furthermore, the following subscriber-controlled components may continue to exist, but may be required to be updated to reflect the deletion: (1) Reports; (2) List Views; (3) Page layouts. The upload of an unmanaged application may be blocked if code contains apex using an indication of deprecation.

With respect to package extension, a tenant may be allowed to safely install an extension so long as all the components it references in the base are present in the customer org. If a base object or code is no longer present (deprecated), this could pose problems for extensions. Thus, the install/upgrade may be allowed even if the extension component refers to a deprecated component. This may include component that were deprecated prior to the first install in the subscriber org. This means the subscriber may not even see a field the extension uses.

When the base package includes a deprecated object that is the master for a detail object in the extension, the install/upgrade of the extension may be blocked if the deprecated object is below the org's minimum version (e.g. to prevent the extension from breaking at runtime). Extensions calling into the partner API may be allowed to reference package versions earlier than the org's minimum. However, doing the same via the enterprise API may be disallowed. Extensions may be revisited to support full EOL for schema and code.

Various user interfaces may be provided to support the aforementioned functionality. Table 12 illustrates various examples of the user interfaces that may be implemented (e.g. by the multi-tenant on-demand database service). Of course, it should be noted that the examples described in Table 12 are set forth for illustrative purposes only, and thus should not be construed as limiting in any manner.

TABLE 12

Apex Code/VF/VF Email Templates
    Ability to set version info on class/trigger/page/component
    View version info in prototype mode for subscribers/developers
    consider hiding "deleted" apex code/vf (unrelated item)
API
    Select version info for enterprise WSDL generation
    Set version info defaults for enterprise and partner WSDL
Fields/Objects
    In subscriber, show version range information, e.g.:
        Available in Versions: 1.2.0-3.5.0
        Available in Versions: 3.0.0-Current
        show that component is now deprecated
    In developer, when deprecating a component, list out all the places
    the component is used. Deprecation may occur through a button
    with a confirmation page.
Setup
    Identify deprecated components from a list.
Package Upload
    Developer will be blocked if package contains apex using
    @deprecated or Schema.Version, since these may make
    no sense once installed in an unmanaged
    package.
Dev Package Detail Page
    Show version range for each component
    Once a component is deprecated, highlight that deprecation in the list
Sub Package Detail Page
    Show first installed and current version for package
    Highlight components that are now deprecated
    List what versions a component is available in
Package Install
    Block extension package install if extension package refers to
    deprecated master object below org's base package min.
    See extension section above for more details.

System Overview

Figure 4:
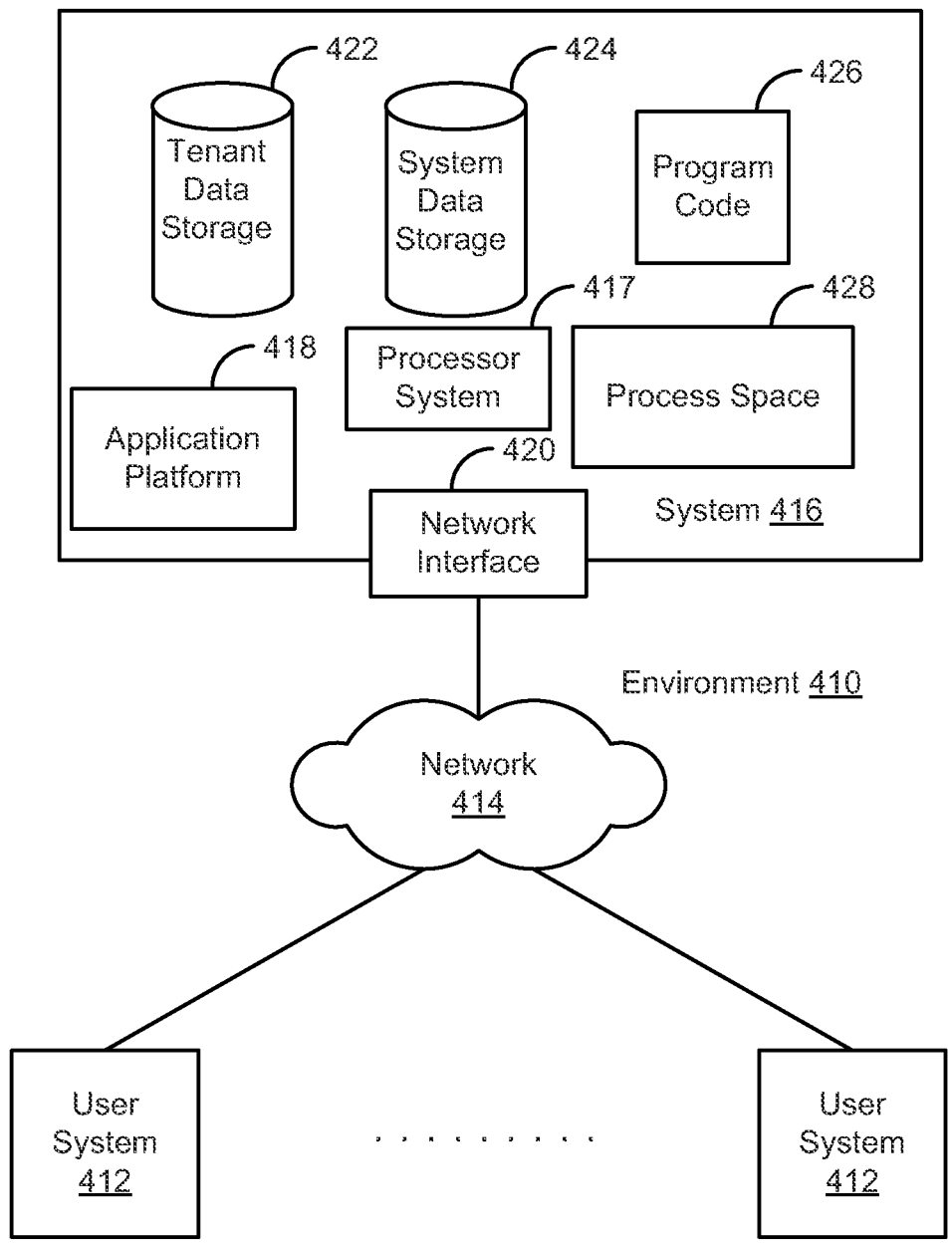
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
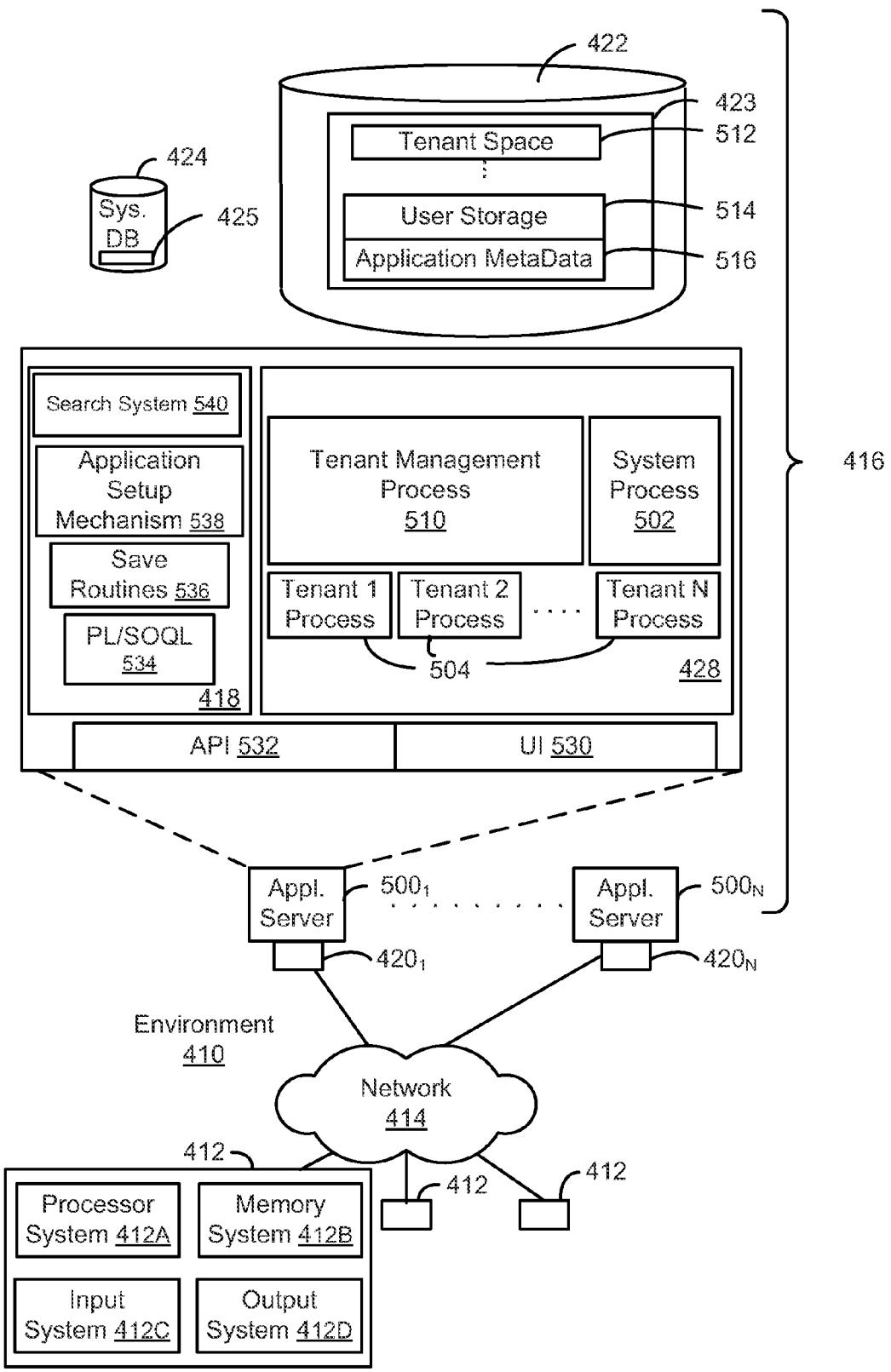
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system-data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising:
    computer code for storing a first application having at least one feature, wherein multiple versions of the feature exist in the first application and wherein the versions are each accessed in the first application by a different set of one or more components;
    computer code for receiving a request from a second application to access the feature of the first application;
    computer code for, in response to the request from the second application, identifying one of the versions of the feature in the first application by:
        selecting at least one of a plurality of predetermined rules for use in determining at least one of the sets of components in the first application allowed to be accessed by the second application, wherein the predetermined rules are specific to, and selected based on, at least one of: a type of code of the second application requesting the access to the feature of the first application, a type of the feature of the first application requested to be accessed by the second application, and an accessibility of the first application to one or more users, and
        determining at least one of the sets of components in the first application allowed to be accessed by the second application by applying the selected predetermined rules to a version associated with the second application;
    computer code for providing, to the second application, access to the determined at least one of the sets of components in the first application.

2. The computer program product of claim 1, wherein the first application includes computer code that is at least one of developed and maintained utilizing a multi-tenant on-demand database service.

3. The computer program product of claim 1, wherein the second application includes one of an application program interface of a multi-tenant on-demand database service and user interface of the multi-tenant on-demand database service.

4. The computer program product of claim 1, wherein the computer program product is operable such that the version associated with the second application is determined from a header of the request.

5. The computer program product of claim 1, wherein the computer program product is operable such that the version associated with the second application is determined from a default version specified by a setting associated with a developer of the calling code.

6. The computer program product of claim 1, wherein the type of the code of the second application requesting access to the feature of the first application includes one of an application program interface and a user interface.

7. The computer program product of claim 1, wherein the type of the feature of the first application requested to be accessed by the second application includes one of standard components managed by a multi-tenant on-demand database service, custom components created by a developer of the application, and components installed as part of the first application.

8. The computer program product of claim 1, wherein for each of the components of the first application, the component is annotated with a version of the component.

9. The computer program product of claim 8, wherein the annotation includes a minimum version of the first application and a maximum version of the first application indicating a range of versions of the first application to which the component corresponds.

10. The computer program product of claim 9, wherein the maximum version is recorded once the component is uploaded as deprecated, the deprecation including an indicator to allow a developer to remove the component.

11. The met computer program product of claim 10, wherein deprecating the component allows the first application to be evolved without introducing an immediate change for existing users of the first application.

12. The computer program product of claim 1, wherein the predetermined rules includes a first predetermined rule allowing access only to a set of one or more components annotated with a version exactly matching the version associated with the second application, and wherein the predetermined rules includes a second predetermined rule allowing access to each set of one or more components annotated with a version exactly matching the version associated with the second application and annotated with a later version to the version associated with the second application.

13. A method, comprising:
    storing a first application having at least one feature, wherein multiple versions of the feature exist in the first application and wherein the versions are each accessed in the first application by a different set of one or more components;
    receiving a request from a second application to access the feature of the first application;
    in response to the request from the second application, identifying one of the versions of the feature in the first application by:
        selecting at least one of a plurality of predetermined rules for use in determining at least one of the sets of components in the first application allowed to be accessed by the second application, wherein the predetermined rules are specific to, and selected based on, at least one of: a type of code of the second application requesting the access to the feature of the first application, a type of the feature of the first application requested to be accessed by the second application, and an accessibility of the first application to one or more users, and
        determining at least one of the sets of components in the first application allowed to be accessed by the second application by applying the selected predetermined rules to a version associated with the second application;
    providing, to the second application, access to the determined at least one of the sets of components in the first application.

14. An apparatus, comprising: a processor for:
storing a first application having at least one feature, wherein multiple versions of the feature exist in the first application and wherein the versions are each accessed in the first application by a different set of one or more components;
receiving a request from a second application to access the feature of the first application;
in response to the request from the second application, identifying one of the versions of the feature in the first application by:
    selecting at least one of a plurality of predetermined rules for use in determining at least one of the sets of components in the first application allowed to be accessed by the second application, wherein the predetermined rules are specific to, and selected based on, at least one of: a type of code of the second application requesting the access to the feature of the first application, a type of the feature of the first application requested to be accessed by the second application, and an accessibility of the first application to one or more users, and
    determining at least one of the sets of components in the first application allowed to be accessed by the second application by applying the selected predetermined rules to a version associated with the second application;
providing, to the second application, access to the determined at least one of the sets of components in the first application.

15. A method for transmitting code for use in a multi-tenant database system on a transmission medium, the method comprising:
transmitting code for storing a first application having at least one feature, wherein multiple versions of the feature exist in the first application and wherein the versions are each accessed in the first application by a different set of one or more components;
transmitting code for receiving a request from a second application to access the feature of the first application;
transmitting code for, in response to the request from the second application, identifying one of the versions of the feature in the first application by;
    selecting at least one of a plurality of predetermined rules for use in determining at least one of the sets of components in the first application allowed to be accessed by the second application, wherein the predetermined rules are specific to, and selected based on, at least one of: a type of code of the second application requesting the access to the feature of the first application, a type of the feature of the first application requested to be accessed by the second application, and an accessibility of the first application to one or more users, and
    determining at least one of the sets of components in the first application allowed to be accessed by the second application by applying the selected predetermined rules to a version associated with the second application; transmitting code for providing, to the second application, access to the determined at least one of the sets of components in the first application.

* * * * *